June 18, 1957  C. O. VAUGHN  2,796,019
BARBECUE MACHINE
Filed Feb. 16, 1954  2 Sheets-Sheet 1
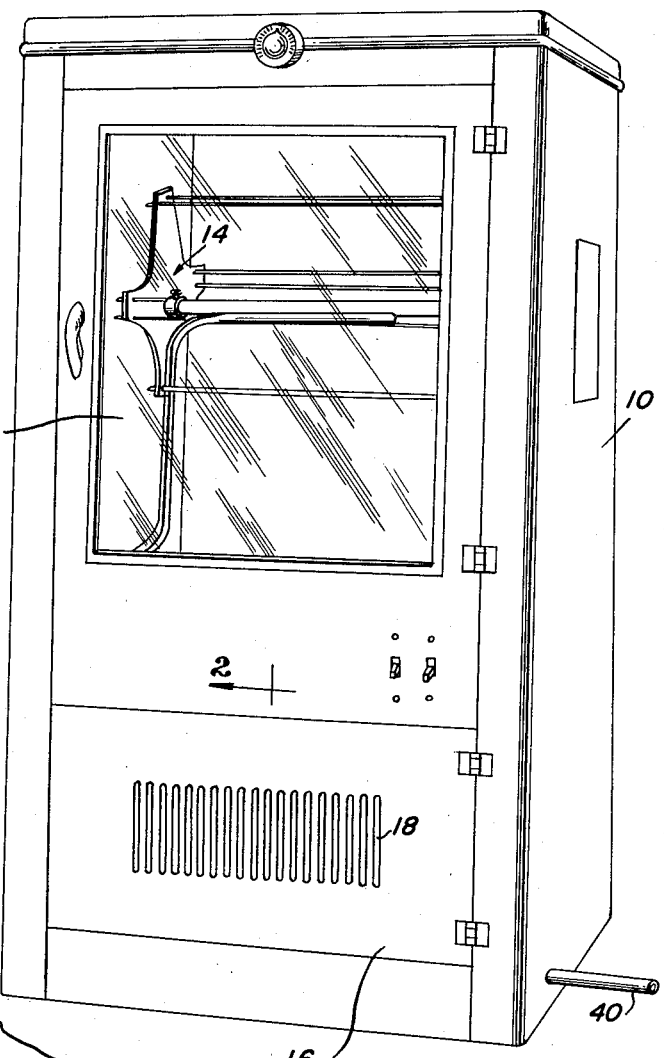
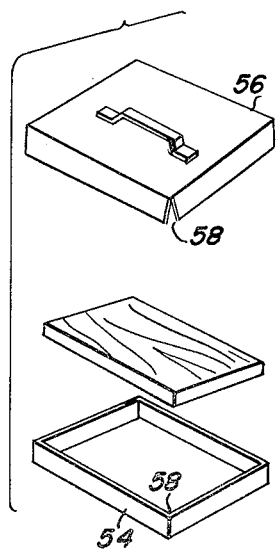
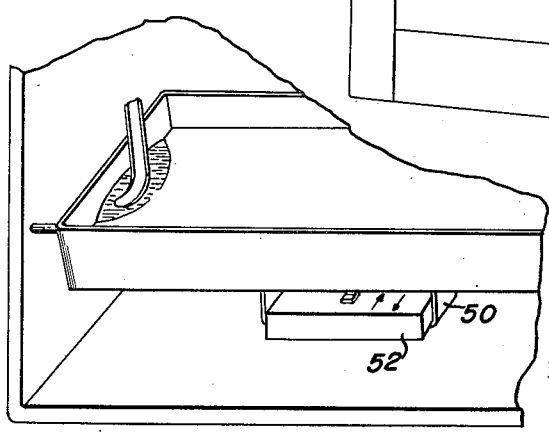
INVENTOR
Charles O. Vaughn
BY Cushman, Darby & Cushman
ATTORNEYS June 18, 1957  C. O. VAUGHN  2,796,019
BARBECUE MACHINE
Filed Feb. 16, 1954  2 Sheets-Sheet 2

INVENTOR
Charles O. Vaughn
BY Cushman, Darby & Cushman
ATTORNEYS

United States Patent Office 2,796,019
Patented June 18, 1957

2,796,019

BARBECUE MACHINE

Charles O. Vaughn, Dayton, Tenn., assignor to Hunt Heater Corporation, Nashville, Tenn., a corporation of Tennessee Application February 16, 1954, Serial No. 410,586

1 Claim. (Cl. 99—346)

This invention relates to a rotisserie or barbecue machine. More particularly, this invention relates to a barbecue machine having improved means for rotating articles to be barbecued in a heated, smoky atmosphere and basting such articles continuously to provide even and thorough broiling without charring, burning, or the formation of an undesirable crust.

Since time immemorial it has been known that broiled meat is best prepared by subjecting the surface to an intermittent or constant bath of basting liquid, that is, the juices of the meat. Many customary rotisseries and barbecue machines have attempted to provide means for following this practice, and a wide variety of cups, scoops, and other basting liquid conveying means have been proposed. However, as many of these proposed means have been complicated, expensive, and easily fouled by the suspended protein material in the basting liquid, there has been a definite need for an improved basting means which is simple, inexpensive, easily cleaned and unlikely to be fouled by the material conveyed.

It is, therefore, an object of this invention to provide a new and improved barbecue machine having simple, foolproof means for continuously supplying basting liquid to roasting meats.

It is a further object of this invention to provide such basting means that may be easily cleaned and which are unlikely to be fouled by congealed solid or semi-solid proteinaceous material.

Other and further objects and advantages of the present invention will be apparent from a consideration of the following description of a specific embodiment, shown for purposes of illustration in the accompanying drawings, in which:

Figure 1 is an overall perspective view of the barbecue machine;

Figure 4 is a somewhat enlarged perspective view showing details of the interior of the barbecue machine;

Figure 5 is an exploded view of the smoke-generating receptacle and smoke-generating material, shown in the respective positions in which they are used.

Figure 2:
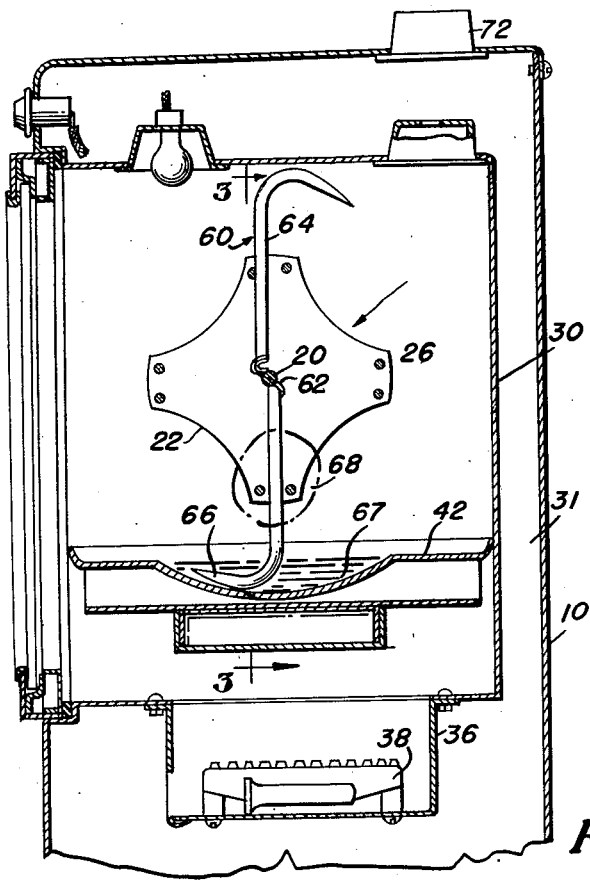
Figure 2 is a section taken alone lines 2—2 of Figure 1.

Generally speaking, this invention comprises a rotisserie provided with a rotating spit means carrying a scoop which is adapted to dip basting fluid which has been collected in a receiver beneath the broiling meat, and to utilize the rotational motion of the split to convey the basting fluid from the scoop to a longitudinally extending channel from which it is dumped on the meat during a portion of the rotational period of the spit means.

Referring to Figure 1, there is shown generally a gas-fired rotisserie for use in restaurants, grills and other large culinary establishments. The rotisserie comprises a casing 10 having a glass panel door 12 providing access to the interior portions, the glass providing a suitable display of the roasting meats disposed therein on split 14. The casing is also provided with a burner access door 16 having air intake grills 18.

Figure 3:
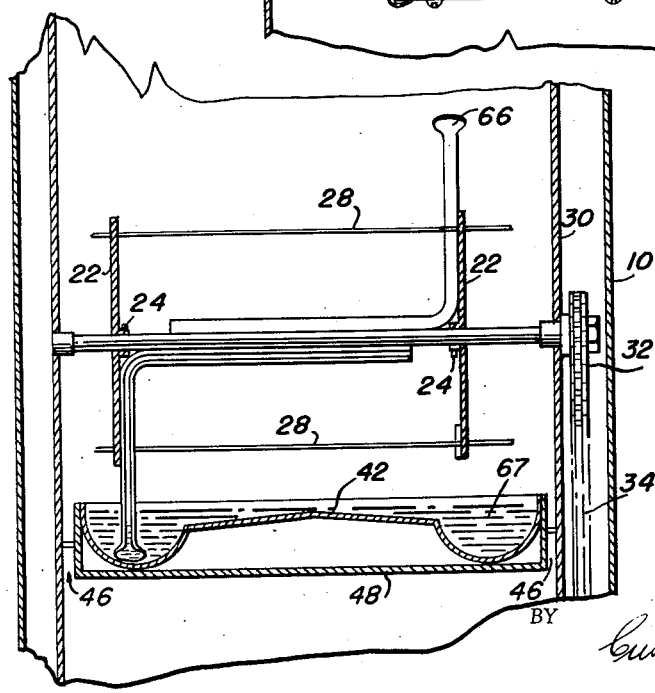
Figure 3 is a section taken along lines 3—3 of Figure 2.
Figure 6:
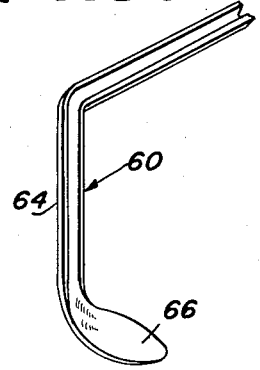
Figure 6 is a perspective view of the basting fluid conduit.

Referring more particularly to Figures 2 and 3, it may be seen that the rotisserie is provided with a rotating spit means indicated generally at 14 which has a longitudinally extending axle 20 which carries supporting plates 22. These plates may be selectively adjusted to varying positions along the axle 18 and may then be secured in the selected position by proper manipulation of set screws 24. The support plates are each provided with apertures 26, which are adapted to receive skewers 28 and to form a support therefor. The skewers are provided with sharp points which pierce the meat to be suspended during the roasting process.

As also shown in Figures 2 and 3, there is provided an inner casing 30 which is separated by a suitable insulating air space 31 from the exterior air casing 10.

As shown in Figure 3, the axle 20 extends through the casing 30 and into the air space 31, and there carries a sprocket wheel 32 which is driven by chain 34 suitably connected to a low speed electric motor (not shown).

The inner casing 30 is provided with a depending well 36 enclosing a suitable gas burner unit 38 which is supplied with fuel by inlet pipe 40 (Fig. 1). The inner casing 30 carries a drip pan or receiver 42 extending from the front to the rear wall thereof, but, as shown in Figure 3, the pan is supported by pins 44 with a small gap 46 between the pan and the side walls for reasons which will be discussed hereinafter. The drip pan 42 is arched and provided with wells 67 at each side. All the basting fluid and juices dripping from the roasting meat will collect in the wells for redistribution, as will be discussed hereinafter.

As scorching or burning of the basting fluid carried on the drip pan is to be avoided, the pan is provided with a flame shield 48 suspended at a distance therebelow. The void space between the flame shield 48 and the drip pan 42 provides an air insulation barrier which will avoid unduly high temperatures in both the drip pan 42 and the basting fluid carried thereon.

As shown in Figures 2 and 4, the flame shield 48 has depending bracket hangers 50 which provide a shelf onto which the metallic container 52 may be slidably disposed. As best shown in Figure 5, the metal container 52 comprises a pan 54 and a cover 56, each having the side wall corners cut away at 58 to provide restricted openings. Any of a large number of smoking or flavoring materials, such as hickory charcoal, may be placed within the container which is in turn hung on brackets 50 directly over the flame jet 38. The heat of the flame will cause the material to smolder, but the restricted openings will not provide enough air to support active combustion so that a small amount of smoking or flavoring material will provide a considerable smoking or flavoring effect for an extended period of time.

Referring more particularly to Figures 2 and 3, the axle 20 has a basting conduit indicated generally at 60, fastened thereto by any suitable means, for example by clips or by welds 62. The basting conduit 60 is an open tube which may be formed of channel shaped structural material and, as shown, it extends along the parallel to the axle for a substantial distance. The conduit is bent at a right angle so that after following the axle for a substantial distance it will then turn outwardly and extend radially for another substantial distance. The bottom of the tube or channel is shown defining a plane which is substantially parallel with the axle 20. The free end of the radially extending portion 64 of the conduit is provided with a scoop or spoon 66 which extends in the direction of the leading edge defined by the rotation of the spit means and the basting conduit 60.

It may be readily seen that the continual rotation of the spit means will cause a given spoon 66 to dip into the well 67 of the receiver and to pick up a small portion of the basting fluid therein. Continued rotation of the spit will bring the radially extending portion of the conduit to a horizontal position and then to an inclined position which will cause the basting fluid to flow down the conduit 64 and into the longitudinally extending portion 62. Further rotation of the spit means will tilt the longitudinal portion 62 to a point where the basting fluid confined therein will spill or dump on the meat, indicated generally in phanton at 68, providing the desired basting effect.

For simplicity, I have shown a spit means provided with two such basting arms; however, it is evident that one can provide any number commensurate with the amount of meat carried by a machine.

While I have shown the conduit as an open channel, it is within the contemplation of this invention to partially or wholly close the radially extending portion 64 and to close and perforate the longitudinally extending portion.

I have shown this rotisserie provided with an electric light 68 for suitably displaying the continual basting of the roasting meat. It provides an attractive spectacle which will draw the interest of the customers to the delicacies purveyed.

The roasting of the meat may, of course, be controlled by adjustment of the gas jet and also by automatically controlled thermostat 70 which will control the flow of fuel to the gas jet by electrically operated valves (not shown). The exhaust gases have the casing 10 through exit pipe 72 and may then be conveyed to the atomsphere by any suitable and well known means.

Having described only a typical preferred form and application of the invention, it is not to be limited or restricted to specific details herein set forth, but I wish to reserve to myself any varations or modifications that may appear to those skilled in the art and falling within the scope of the following claim:

What is claimed is:

In a rotisserie, a rotatably mounted horizontally extending axle; motive means connected to said axle to effect a rotation thereof; spit means comprising at least two skewer support means mounted on said axle and extending radially therefrom and fixed against movement relative thereto, said skewer support means being spaced from one another and defining a plurality of skewer mounting means, a plurality of skewers removably mounted within said skewer mounting means to extend parallel to said axle while spaced radially therefrom; receiver means disposed under said spit means to catch and retain basting fluid; and basting means comprising a basting fluid channel fixed to said spit means, said channel having an open first end portion extending parallel to said axle, said channel portion having an open intermediate portion extending radially of said axle, said channel having a second end portion defining a scoop, the channel elements being so arranged and dimensioned that said scoop will dip into basting fluid held in the receiver during a portion of the rotational cycle of said spit means; the entire arrangement being such that basting fluid gathered by said scoop will flow through said intermediate portion of said channel to said first end portion of said channel during a subsequent portion of the rotational cycle of said spit means, and will be dumped from said second end portion of said channel onto one of said skewers, and whatever material may be mounted on said skewer, during a still further portion of said rotational cycle of said spit means.

References Cited in the file of this patent

UNITED STATES PATENTS

| 355,329 | Le Blanc | Jan. 4, 1887 |
| 389,071 | Glessnen | Sept. 4, 1888 |
| 399,561 | Rich | Mar. 12, 1889 |
| 431,686 | Carmichael | July 8, 1890 |
| 928,795 | Prims | July 20, 1909 |
| 1,114,603 | Giger | Oct. 20, 1914 |
| 2,182,225 | Garvis | Dec. 5, 1929 |
| 2,327,123 | Morse | Aug. 17, 1943 |

FOREIGN PATENTS

| 127,247 | Germany | Jan. 9, 1902 |